US011840604B2

(12) United States Patent
Choi et al.

(10) Patent No.: US 11,840,604 B2
(45) Date of Patent: Dec. 12, 2023

(54) PROCESS FOR PREPARATION OF BLOCK COPOLYMER

(71) Applicant: LG CHEM, LTD., Seoul (KR)

(72) Inventors: Jung Yun Choi, Daejeon (KR); Sungwoon Heo, Daejeon (KR); Chul Woong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 365 days.

(21) Appl. No.: 17/269,963

(22) PCT Filed: Mar. 17, 2020

(86) PCT No.: PCT/KR2020/003638
§ 371 (c)(1),
(2) Date: Feb. 19, 2021

(87) PCT Pub. No.: WO2020/197147
PCT Pub. Date: Oct. 1, 2020

(65) Prior Publication Data
US 2021/0309800 A1     Oct. 7, 2021

(30) Foreign Application Priority Data

Mar. 26, 2019  (KR) .................. 10-2019-0034613
Mar. 16, 2020  (KR) .................. 10-2020-0031968

(51) Int. Cl.
*C08G 63/85*      (2006.01)
*C08G 63/08*      (2006.01)

(52) U.S. Cl.
CPC ............. *C08G 63/85* (2013.01); *C08G 63/08* (2013.01)

(58) Field of Classification Search
USPC ....................................................... 528/357
See application file for complete search history.

(56) References Cited

U.S. PATENT DOCUMENTS

| | | |
|---|---|---|
| 2011/0046339 A1 | 2/2011 | Park et al. |
| 2011/0245420 A1 | 10/2011 | Rasal et al. |
| 2014/0018574 A1 | 1/2014 | Raith et al. |
| 2015/0018497 A1 | 1/2015 | Farrugia et al. |
| 2020/0172680 A1 | 6/2020 | Choi et al. |
| 2020/0270649 A1 | 8/2020 | Kang et al. |

FOREIGN PATENT DOCUMENTS

| | | |
|---|---|---|
| CN | 1908030 A | 2/2007 |
| CN | 107522852 | 12/2017 |
| CN | 107602834 A | 1/2018 |
| JP | H02-084431 A | 3/1990 |
| JP | 06298921 A | 10/1994 |
| JP | 07316271 A | 12/1995 |
| JP | 2010510372 A | 4/2010 |
| JP | 2015-017251 A | 1/2015 |
| KR | 10-2008-0046795 | 5/2008 |
| KR | 10-0957773 | 5/2010 |
| KR | 10-2015-0032579 | 3/2015 |
| KR | 10-2017-0028186 A | 3/2017 |
| KR | 1020180072481 A | 6/2018 |
| KR | 1020190060584 A | 6/2019 |
| KR | 10-2019-0083816 | 7/2019 |
| KR | 10-2019-0108892 | 9/2019 |
| WO | 2019-135582 | 7/2019 |

OTHER PUBLICATIONS

Ramier, J. et al., "Microwave-Assisted Synthesis and Characterization of Biodegradable Block Copolyesters Based on Poly(3-hydroxyalkanoate)s and Poly(D,L-lactide)", Journal of Polymer Science Part A: Polymer Chemistry, 2012, vol. 50, pp. 1445-1455.
Tripathi, L. et al., "Biosynthesis and Characterization of Diblock Copolymer of P(3-Hydroxypropionate)-block-P(4-hydroxybutyrate) from Recombinant *Escherichia coli*" Biomacromolecules, 2013, vol. 14, No. 3, pp. 862-870.
Lee, "Control of Molecular Weight and Terminal Groups of Poly (3-hydroxybutyrate) in Bio-synthesis" Textile Coloration and Finishing, The Korean Society of Dyers and Finishers, 2018, vol. 30 Issue 2, pp. 130-140 [English Langauge Abstract included].
Hiki, S. et al., "Synthesis and characterization of hydroxy-terminated [RS]-poly(3-hydroxybutyrate) and its utilization to block copolymerization withL-lactide to obtain a biodegradable thermoplastic elastomer" Polymer, 2000, vol. 41, pp. 7369-7379.
Lee, J. W. et al., "Microbial production of building block chemicals and polymers" Current Opinion in Biotechnology, Mar. 17, 2011, vol. 22, pp. 758-767.
Lebarbe et al., "Fully bio-based poly(l-lactide)-b-poly(ricinoleic acid)-b-poly(l-lactide) triblock copolyesters: investigation of solid-state morphology and thermo-mechanical properties" Polymer Chemistry, 2013, vol. 4, pp. 3357-3369.
Wu et al., "Synthesis, characterization and biocompatibility of novel biodegradable poly[((R)-3-hydroxybutyrate)-block-(D,L-lactide)-block-(ε-caprolactone)] triblock copolymers" Polymer International, 2008, vol. 57, No. 7, pp. 939-949.
Haynes et al., "In Situ Copolyesters Containing Poly(l-lactide) and Poly(hydroxyalkanoate) Units" Biomacromolecules, vol. 8, No. 4, pp. 1131-1137.
Masutani K., and Kimura, Y., "Chapter 1 PLA Synthesis. From the Monomer to the Polymer" RSC Polymer Chemistry Series No. 12., 2014, 34 pages.
Pholharn, et. al., "Ring opening polymerization of poly(Llactide) by macroinitiator" In AIP Conference Proceedings, 2019, vol. 2065, 030016, 5 pages.
Zhang, et al., "A new synthetic route to poly [3-hydroxypropionic acid](P [3-HP]): ring-opening polymerization of 3-HP macrocyclic esters" Macromolecules, 2004, vol. 37, No. 22, pp. 8198-8200.

(Continued)

*Primary Examiner* — Terressa Boykin
(74) *Attorney, Agent, or Firm* — Bryan Cave Leighton Paisner LLP

(57) ABSTRACT

Provided is a method for preparing a block copolymer, the method comprising subjecting a lactide monomer to a ring-opening polymerization in the presence of a poly(3-hydroxypropionate) initiator to prepare a polylactide-poly(3-hydroxypropionate)block copolymer.

10 Claims, 1 Drawing Sheet

(56) References Cited

OTHER PUBLICATIONS

Ren et al., "Microbial synthesis of a novel terpolyester P(LA-co-3HB-co-3HP) from low-cost substrates" Microbial Biotechnology, 2017, vol. 10, No. 2, pp. 371-380.
Supthanyakul et al., "Poly (l-lactide-b-butylene succinate-b-l-lactide) triblock copolymer: A multi-functional additive for PLA/PBS blend with a key performance on film clarity", Polymer Degradation and Stability, 2017, 142, pp. 160-168.
Catiker et al., "Synthesis and characterization of novel ABA type poly(Ester-ether) triblock copolymers", Journal of Polymer Research, 2019, vol. 26, pp. 123-131.
Williams, S. F., & Martin, D. P., "Applications of PHAs in Medicine and Pharmacy", Biopolymers, 1999, vol. 4, pp. 91-103.
Zhao et al., "Biosynthesis of Poly (3-hydroxypropionate-co-lactate) from Glycerol by Engineered *Escherichia coli*" China Biotechnology, 2018, vol. 38 Issue 2, pp. 46-53 [English Language Abstract included].

[FIG. 1]
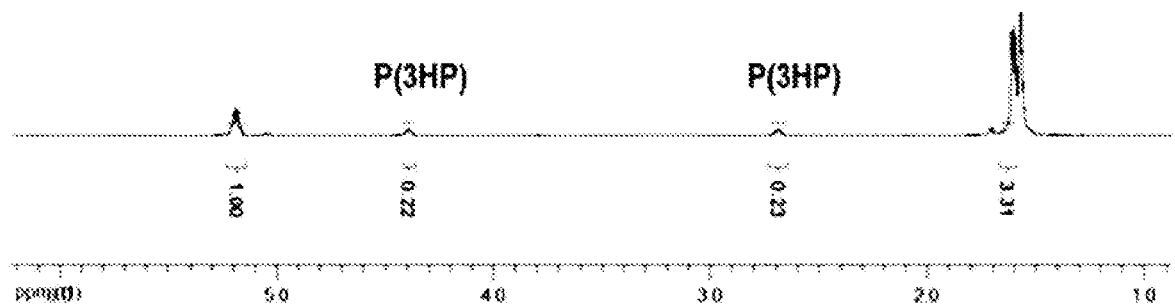
[FIG. 2]
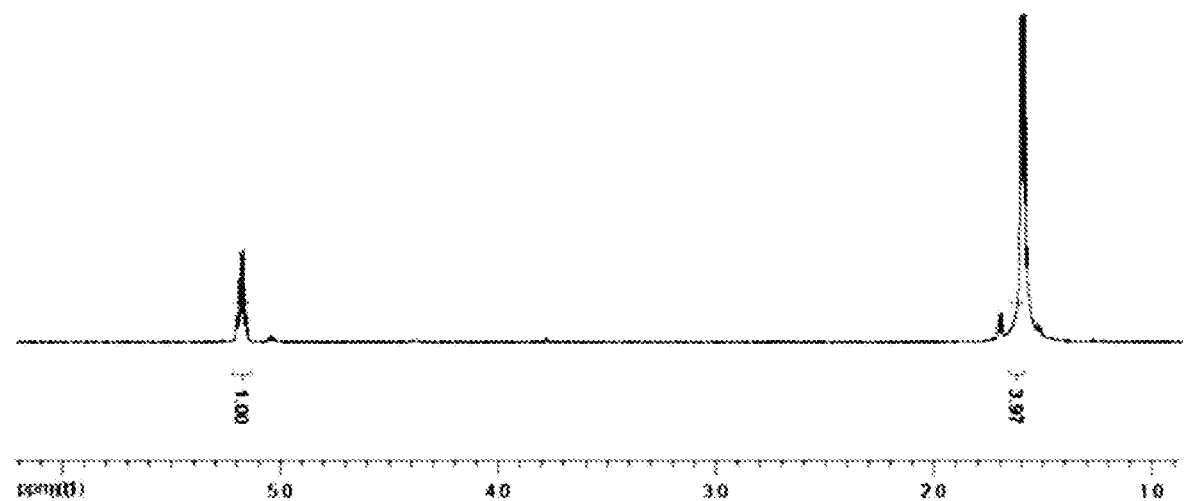

PROCESS FOR PREPARATION OF BLOCK COPOLYMER

CROSS-REFERENCE TO RELATED APPLICATION(S)

This application is a National Stage Application of International Application No. PCT/KR2020/003638 filed on Mar. 17, 2020, which claims priority to Korean Patent Application No. 10-2019-0034613 filed on Mar. 26, 2019 and Korean Patent Application No. 10-2020-0031968 filed on Mar. 16, 2020 with the Korean Intellectual Property Office, the disclosures of which are incorporated herein by reference in their entirety.

TECHNICAL FIELD

The present disclosure relates to a method of preparing a polylactide-poly(3-hydroxypropionate)block copolymer.

BACKGROUND

Polylactide (or polylactic acid) resin is a plant-derived resin obtained from plants such as corn, and is attracting attention as an environment-friendly material having excellent tensile strength and elastic modulus while having biodegradable properties. Specifically, unlike petroleum-based resins such as polystyrene resin, polyvinyl chloride (PVC) resin, and polyethylene that have been used in the past, polylactide (or polylactic acid) resin has the effects of preventing the depletion of petroleum resources and suppressing carbon dioxide emissions, so it can reduce environmental pollution, which is a drawback of petroleum-based plastic products. Therefore, as the problem of environmental pollution caused by waste plastic, etc. has emerged as a social problem, it has been attempted to expand the scope of application to the fields of the products where general plastics (petroleum-based resins) were used, such as food packaging materials and containers, and electronic product cases.

However, the polylactide resin has a lower impact resistance and heat resistance than conventional petroleum-based resins, and thus its application range is limited. Further, the polylactide resin has poor elongation characteristics and easily exhibits brittleness, which has a limitation as a general-purpose resin.

Therefore, in the existing technology, research is underway to improve physical properties by compounding materials such as PBS (poly(butylene succinate)) and PBAT (poly(butylene adipate-co-terephthalate)), which are biodegradable and have relatively excellent elongation characteristics, with polylactide, or by forming block copolymers. However, in the case of PBS and PBAT, there is a problem that the tensile strength is low, and the tensile strength of the compound or block copolymer is also lowered.

In addition, there have been attempts to form a copolymer of biodegradable polyhydroxyalkanoate (PHA) and a polylactic acid in the related art, there is a problem that crystallinity is not maintained, and thus, the tensile strength is rather reduced.

DETAILED DESCRIPTION

Technical Problem

It is one object of the present disclosure to provide a polylactide-poly(3-hydroxypropionate)block copolymer having excellent mechanical properties such as tensile modulus, tensile strength, elongation at break and impact strength while maintaining environmental friendliness and biodegradability.

Technical Solution

Provided herein is a method for preparing a block copolymer comprising subjecting a lactide monomer to a ring-opening polymerization in the presence of a poly(3-hydroxypropionate) initiator to prepare a polylactide-poly(3-hydroxypropionate)block copolymer.

Hereinafter, a method for preparing a block copolymer according to specific embodiments of the present disclosure will be described in more detail.

Unless particularly mentioned herein, the term "including" or "containing" refers to including any element (or component) without any limitation, and should not be construed as excluding addition of other elements (or components).

Also, throughout the present specification, the term "lactide monomer" can be defined as follows. Typically, lactides can be classified into L-lactide consisting of L-lactic acid, D-lactide consisting of D-lactic acid, and meso-lactide consisting of one L-type and one D-type. Also, a mixture of L-lactide and D-lactide in a weight ratio of 50:50 is referred to as D,L-lactide or rac-lactide. Among these lactides, the polymerization proceeding only with either of L-lactide and D-lactide that have a high level of optical purity is known to yield an L- or D-polylactide (PLLA or PDLA) with a high level of stereoregularity. Such polylactides have a faster crystallization rate and a higher crystallization degree than a polylactide having a low level of optical purity. However, the term "lactide monomer" is defined to include all types of lactides regardless of the difference in the characteristics of lactides depending on their types and the difference in the characteristics of the polylactides obtained therefrom.

And, throughout the present specification, "polylactide-poly(3-hydroxypropionate)block copolymer" refers to a polylactide-poly(3-hydroxypropionate)block copolymer including a polylactide repeating unit and a poly(3-hydroxypropionate) repeating unit. Such "polylactide-poly(3-hydroxypropionate)block copolymer" can be prepared by a process including a step of forming the polylactide repeating unit and the poly(3-hydroxypropionate) repeating unit by the ring-opening polymerization of "lactide monomer" in the presence of the above-mentioned poly(3-hydroxypropionate) initiator. The polymer obtained after the completion of such ring opening polymerization and the formation of the repeating unit can be referred to as the "polylactide-poly(3-hydroxypropionate)block copolymer". In this case, as stated above, the category of the "lactide monomer" includes any types of lactides.

Further, in the category of the polymer that can be referred to as the "polylactide-poly(3-hydroxypropionate)block copolymer", all the polymers can be included in any state after the completion of the ring opening polymerization and the formation of the repeating unit, for example, unpurified or purified polymers after the completion of the ring opening polymerization, the polymers contained in the liquid or solid resin composition prior to being molded into an article, or the polymers contained in plastics or woven materials after being molded into an article. Accordingly, throughout the present specification, the physical properties (weight average molecular weight, or the like) of the "polylactide-poly(3-hydroxypropionate)block copolymer" can be defined by the physical properties of the polymer in any state after the completion of the ring opening polymerization and the formation of the repeating unit.

On the other hand, the present inventors have found that when a block copolymer is prepared through the step of subjecting a lactide monomer to a ring-opening polymerization in the presence of a poly(3-hydroxypropionate) initiator, a block copolymer including a polylactide repeating unit and a poly(3-hydroxypropionate) repeating unit can be prepared, and such block copolymer is excellent in mechanical properties such as tensile modulus, tensile strength, elongation at break and impact strength while maintaining environmental friendliness and biodegradability, thereby completing the present disclosure.

According to one embodiment of the present disclosure, there can be provided a method for preparing a block copolymer comprising subjecting a lactide monomer to a ring-opening polymerization in the presence of a poly(3-hydroxypropionate) initiator to prepare a polylactide-poly(3-hydroxypropionate)block copolymer.

In general, the polymerization reaction of a polylactide resin by the ring-opening polymerization of a lactide monomer is initiated by a compound having a hydroxy group at the end, and is carried out by successively ring-opening and inserting a lactide monomer into the compound having a hydroxy group at the end.

Therefore, the poly(3-hydroxypropionate) initiator includes a hydroxy group and/or an alkoxy group at the end. Thus, when the hydroxy group and/or the alkoxy group, which is the end of the poly(3-hydroxypropionate) initiator, is added to the ring-opening polymerization reaction of the lactide monomer, the lactide monomer starts to be inserted from the end, and as a result, a polylactide-poly(3-hydroxypropionate) block copolymer can be prepared.

Therefore, when the ring-opening polymerization reaction of the lactide monomer is performed in the presence of the poly(3-hydroxypropionate) initiator, the poly(3-hydroxypropionate) serves as a polymerization initiator and at the same time, is included as a repeating unit in the block copolymer, thus making it possible to improve mechanical properties such as flexibility and impact strength of the finally prepared block copolymer. Specifically, since the poly(3-hydroxypropionate) is included in the finally prepared block copolymer, it is possible to lower the glass transition temperature (Tg) of the block copolymer and thus increase the flexibility.

In this case, the dosage of the poly(3-hydroxypropionate) initiator can be selected within an appropriate range in consideration of the content of the repeating unit of the poly(3-hydroxypropionate) contained in the finally prepared block copolymer and the molar ratio of the hydroxy group and/or alkoxy group of the initiator required to initiate the minimum polymerization. Specifically, in consideration of the minimum content for optimizing the flexibility and mechanical properties of the finally prepared block copolymer, and acting as an initiator of the ring-opening polymerization reaction, the poly(3-hydroxypropionate) initiator can be added in an amount of 0.01 parts by weight or more, 0.1 to 100 parts by weight, 0.5 to 90 parts by weight, 0.7 to 80 parts by weight, or 0.9 to 70 parts by weight based on 100 parts by weight of the lactide monomer.

The poly(3-hydroxypropionate) initiator can have a weight average molecular weight of 1,500 to 50,000, 2,000 to 40,000, or 2,200 to 30,000 in order to exhibit excellent physical properties of the block copolymer without deteriorating polymerization activity. When the weight average molecular weight of the poly(3-hydroxypropionate) initiator is less than 1,500, the content of poly(3-hydroxypropionate) can be reduced, and when the weight average molecular weight exceeds 50,000, the polymerization activity can be reduced.

On the other hand, before the ring-opening polymerization step, 3-hydroxypropionate can be subjected to condensation polymerization to prepare the poly(3-hydroxypropionate) initiator. The reactant including the prepared poly(3-hydroxypropionate) initiator and lactide monomer is dried, and then, the dried poly(3-hydroxypropionate) initiator and lactide monomer can be subjected to a ring-opening polymerization to prepare the above-mentioned block copolymer.

As the catalyst used in the ring-opening polymerization, all catalysts generally used in the preparation of a polylactide resin by the ring-opening polymerization of a lactide monomer can be used. For example, the ring-opening polymerization can be performed in the presence of one or more catalysts selected from the group consisting of an organometallic complex catalyst and an organic catalyst.

The organometallic complex catalyst can be used without limitation in its composition, as long as it is generally used for preparing a polylactide resin by a ring-opening polymerization of a lactide monomer. For example, the organometallic complex catalyst can be a catalyst of the following Chemical Formula 1:

$$MA^1_p A^2_{2-p}$$      Chemical Formula 1 wherein in Chemical Formula 1:

M is Al, Mg, Zn, Ca, Sn, Fe, Y, Sm, Lu, Ti or Zr;

p is an integer from 0 to 2; and $A^1$ and $A^2$ are each independently an alkoxy or carboxyl group.

More specifically, $MA^1_p A^2_{2-p}$ can be tin (II) 2-ethylhexanoate $(Sn(Oct)_2)$.

On the other hand, the organic catalyst can be used without limitation in its composition as long as it is generally used for preparing a polylactide resin by a ring-opening polymerization reaction of a lactide monomer. For example, the organic catalyst can be one or more compounds selected from the group consisting of the following 1,5,7-triazobicyclo-[4,4,0]dec-5-ene (TBD), the following 1,8-diazabicyclo[5.4.0]undec-7-ene (DBU), the following 7-methyl-1,5,7-triazabicyclo[4.4.0]dec-5-ene (MTBD), the following 4-dimethylaminopyridine (DMAP), the following 4-(1-pyrrolidinyl)pyridine (PPY), imidazole, triazolium, thiourea, tertiary amine and creatinine:

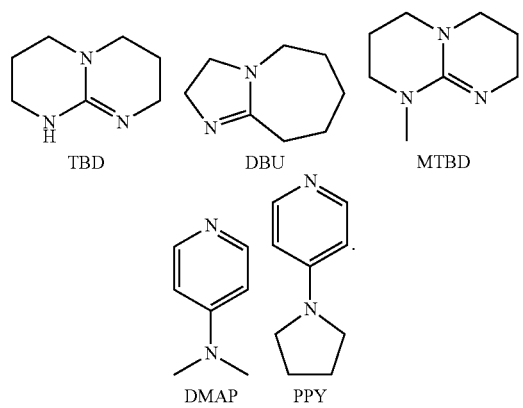

The imidazole can be one or more compounds selected from the group consisting of the following compounds:

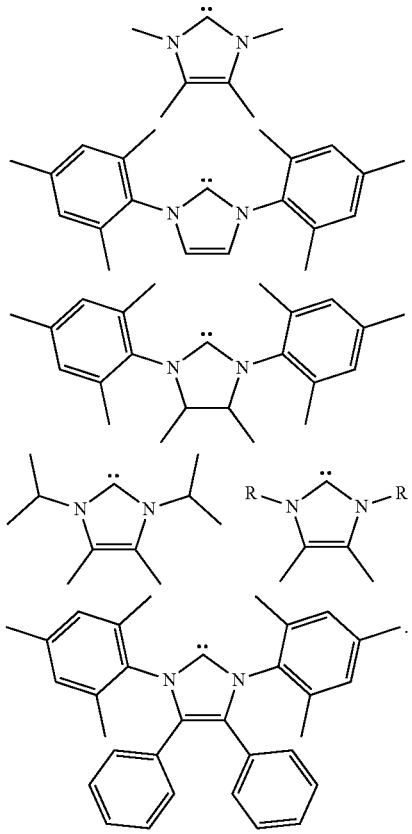

R = CH₃
R = CH(CH₃)
R = C(CH₃)₃
R = adamantyl

The triazolium can be the following compound:

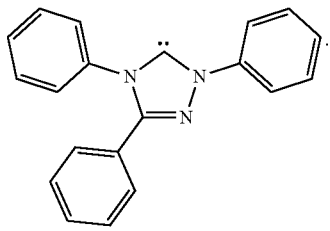

The thiourea can be one or more compounds selected from the group consisting of the following compounds:

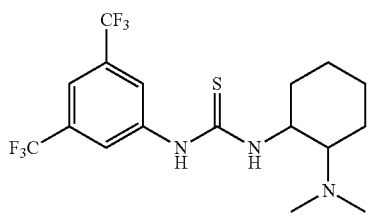

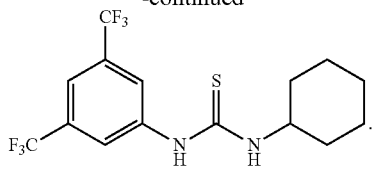

The tertiary amine can be one or more compounds selected from the group consisting of the following compounds:

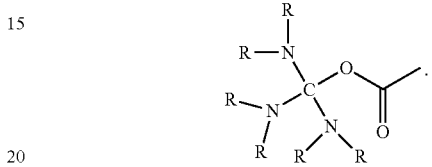

R = CH₃
R = CH(CH₃)
R = C(CH₃)₃
R = adamantyl

When the lactide ring-opening polymerization reaction proceeds in the presence of the above-mentioned catalyst, depolymerization or decomposition of the finally prepared block copolymer can be suppressed, and a polylactide-poly(3-hydroxypropionate)block copolymer having a higher molecular weight and excellent mechanical properties can be obtained with a higher conversion rate.

In the method for preparing a block copolymer according to the one embodiment, the content of the catalyst can be 0.01 to 10 mol %, 0.05 to 8 mol %, 0.07 to 5 mol %, or 0.09 to 3 mol % based on 100 mol % of the lactide monomer. When the content of the catalyst relative to 100 mol % of the lactide monomer is less than 0.01 mol %, polymerization activity may not be sufficient, and when the content of the catalyst exceeds 10 mol %, the residual catalyst amount of the prepared polylactide-poly(3-hydroxypropionate) block copolymer becomes larger, which can lead to decomposition or molecular weight reduction of the copolymer due to depolymerization such as transesterification reaction.

The ring-opening polymerization can be performed at 150 to 200° C. for 5 minutes to 10 hours.

Further, the ring-opening polymerization reaction can be performed by bulk polymerization using substantially no solvent. At this time, using substantially no solvent can include an embodiment of using a small amount of solvent for dissolving the catalyst, for example, up to the embodiment of using less than 1 ml of solvent per 1 kg of lactide monomer used. As the ring-opening polymerization proceeds by bulk polymerization, it becomes possible to omit the process for removing the solvent after polymerization, and decomposition or loss of the resin in such a solvent removal process can also be suppressed. In addition, by the bulk polymerization, the polylactide-poly(3-hydroxypropionate)block copolymer can be obtained with high conversion and yield.

The polylactide-poly(3-hydroxypropionate)block copolymer prepared by the preparation method according to the above embodiment can have a weight average molecular weight of 10,000 to 400,000, 15,000 to 350,000, 20,000 to 300,000, or 25,000 to 250,000.

As described above, in the case of the conventional polylactide resin, it has been in the spotlight due to its mechanical properties that are relatively excellent as a biodegradable resin, but due to its high tensile modulus value, that is, the brittleness of the resin itself, there was a limit to applying it to multiple products. On the other hand, since the polylactide-poly(3-hydroxypropionate)block copolymer according to the one embodiment exhibits excellent mechanical properties such as tensile strength and elongation at break while being excellent in flexibility, the brittleness problem of conventional polylactide resins can be solved and its application fields can be expanded.

Advantageous Effects

According to the present disclosure, a polylactide-poly (3-hydroxypropionate)block copolymer having excellent mechanical properties such as tensile modulus, tensile strength, elongation at break and impact strength while maintaining environmental friendliness and biodegradability can be provided.

BRIEF DESCRIPTION OF THE DRAWINGS

FIG. 1 is a graph showing the results of NMR analysis of the block copolymer prepared in Example 3.

FIG. 2 is a graph showing the results of NMR analysis of the polymer prepared in Comparative Example 1.

EXAMPLES

Hereinafter, the present disclosure will be described in more detail by way of examples. However, the following examples are for illustrative purposes only, and the contents of the present disclosure are not limited thereby.

Examples 1 to 4

(1) Preparation of poly(3-hydroxypropionate) Oligomer 7 g (77.71 mmol) of 3-hydroxypropionate was dried, and then subjected to condensation polymerization in the presence of p-toluene sulfonic acid (p-TSA) catalyst at a temperature of 130° C. for 24 hours to prepare a poly(3-hydroxypropionate) oligomer.

The weight average molecular weight of the prepared poly(3-hydroxypropionate) oligomer was 2,430.

(2) Preparation of polylactide-poly(3-hydroxypropionate)block Copolymer

To a 500 mL round flask, L-lactide, poly(3-hydroxypropionate) oligomer and tin(II) 2-ethylhexanoate were added in the amounts shown in Table 1 below, and vacuum-dried at room temperature for 4 hours by applying a vacuum sufficiently.

Subsequently, the flask was placed in an oil bath preheated to 130° C., the temperature of which was raised to 180° C., and then the ring-opening polymerization reaction was carried out for 2-30 minutes. After the reaction was completed, the reaction product was dissolved in chloroform and then extracted with methanol to recover the block copolymer.

TABLE 1

| (unit: g) | L-lactide | Tin(II) 2-ethylhexanoate | Poly (3-hydroxypropionate) oligomer |
|---|---|---|---|
| Example 1 | 16.00 | 0.02 | 0.16 |
| Example 2 | 16.00 | 0.02 | 0.80 |
| Example 3 | 16.00 | 0.02 | 1.60 |
| Example 4 | 16.00 | 0.02 | 0.32 |

Comparative Examples 1 and 2

To a 500 mL round flask, L-lactide, dodecanol, and tin(II) 2-ethylhexanoate were added in the amounts shown in Table 2 below, and vacuum-dried at room temperature for 4 hours by applying a vacuum sufficiently.

Subsequently, the flask was placed in an oil bath preheated to 130° C., the temperature of which was raised to 180° C., and then a ring-opening polymerization reaction was carried out for 20 minutes. After the reaction was completed, the reaction product was dissolved in chloroform and then extracted with methanol to recover the polymer.

TABLE 2

| (unit: g) | L-lactide | Tin(II) 2-ethylhexanoate | Dodecanol |
|---|---|---|---|
| Comparative Example 1 | 16.00 | 0.04 | 0.01 |
| Comparative Example 2 | 16.00 | 0.04 | 0.02 |

Evaluation

1. NMR (Nuclear Magnetic Resonance) Analysis

NMR analysis was performed at room temperature using an NMR spectrometer including a Varian Unity Inova (500 MHz) spectrometer having a triple resonant 5 mm probe. The block copolymers and polymers prepared in Examples 1 to 4 and Comparative Example 1, respectively, were diluted to a concentration of about 10 mg/ml and used as an analysis target material in a solvent for NMR measurement ($CDCl_3$), and chemical shifts were expressed in ppm.

FIG. 1 is a graph showing the NMR analysis results of the block copolymer prepared in Example 3, and FIG. 2 is a graph showing the results of NMR analysis of the polymer prepared in Comparative Example 1. On the other hand, according to FIGS. 1 and 2, it was confirmed that the NMR analysis graph of the block copolymer of Example 3 shows a poly(3-hydroxypropionate) peak, unlike the NMR analysis graph of the polymer of Comparative Example 1.

In addition, the integration ratio of the poly(3-hydroxypropionate) peak was calculated from the graphs of the NMR analysis results of Examples 1 to 4, which is shown in the "content of poly(3-hydroxypropionate) analyzed by NMR" in Table 3 below.

TABLE 3

| | Example 1 | Example 2 | Example 3 | Example 4 |
|---|---|---|---|---|
| Content of poly (3-hydroxypropionate) actually used | 0.160 g | 0.800 g | 1.600 g | 0.320 g |
| Content of poly (3-hydroxypropionate) analyzed by NMR | 0.384 g | 0.800 g | 1.600 g | 0.640 g |

According to Table 3, Examples 1, 2 and 4 also showed a poly(3-hydroxypropionate) peak in NMR analysis, as in Example 3. In particular, it can be predicted that the poly (3-hydroxypropionate) oligomer used in the method for preparing the block copolymer of Examples 1 to 4 was mostly used as the reactant.

2. GPC (Gel Permeation Chromatography) Analysis

The weight average molecular weight (Mw) and number average molecular weight (Mn) of the block copolymers of Examples 1 to 4 and the polymers of Comparative Examples 1 and 2 were determined by gel permeation chromatography (GPC) (Waters: Waters707). The block copolymer/polymer to be measured was dissolved in chloroform to a concentration of 4000 ppm, and 100 μl was injected into GPC. Chloroform was used as the mobile phase of GPC, the flow rate was 1.0 mL/min, and the analysis was performed at 35° C. The column connected four Waters HR-05,1,2,4E in series. RI and PAD Detector was used as the detector, and the measurement was performed at 35° C.

TABLE 4

|  | $Mn_{theoretical}$ | Number average molecular weight (Mn) | Weight average molecular weight (Mw) | Polydispersity Index (PDI) |
| --- | --- | --- | --- | --- |
| Example 1 | 245,211 | 66,300 | 220,000 | 1.74 |
| Example 2 | 50,986 | 37,706 | 42,433 | 1.13 |
| Example 3 | 26,708 | 15,200 | 31,700 | 2.08 |
| Example 4 | 113,200 | 75,500 | 124,000 | 1.65 |
| Comparative Example 1 | 288,186 | 91,731 | 180,524 | 1.97 |
| Comparative Example 2 | 144,186 | 55,984 | 155,050 | 2.06 |

—$Mn_{theoretical}$: Theoretical number average molecular weight calculated using the molar ratio of the initiator added—polydispersity index (PDI): calculated by dividing the measured weight average molecular weight by the number average molecular weight.

According to Table 4, it was confirmed that dodecanol was used as an initiator in Comparative Examples 1 and 2, and that as the content of dodecanol increased, the number average molecular weight and the weight average molecular weight of the polymer decreased. Similarly, it was confirmed that in Examples 1 to 4, as the content of poly(3-hydroxypropionate) disclosed in Table 1 increased, the number average molecular weight and weight average molecular weight of the block copolymer decreased, so that poly (3-hydroxypropionate) acts as an initiator.

3. Measurement of Tensile Elongation

The polymers obtained in Examples 1, 4 and Comparative Example 1 were used, and a Hot-press (Limotem QM900S) device was used to prepare a dogbone shaped test specimen corresponding to ASTM D638 Type V at 170° C.

The tensile elongation of the film was measured according to the measurement method of IPC-TM-650 using a tensile strength meter (manufacturer: Instron, model name: 3345 UTM) for the prepared test specimen.

TABLE 5

|  | Example 1 | Example 4 | Comparative Example 1 |
| --- | --- | --- | --- |
| Tensile elongation (%) | 225 | 130 | 2.5 |

According to Table 5, it was confirmed that the copolymers of Examples 1 and 4, in which L-lactide was subjected to a ring-opening polymerization in the presence of a poly(3-hydroxypropionate) initiator, exhibited a remarkably higher tensile elongation than Comparative Example 1, in which L-lactide was subjected to a ring opening polymerization in the presence of dodecanol.

The invention claimed is:

1. A method for preparing a block copolymer, comprising subjecting a lactide monomer to a ring-opening polymerization in the presence of a poly(3-hydroxypropionate) initiator to prepare a polylactide-poly(3-hydroxypropionate) block copolymer,
    wherein the poly(3-hydroxypropionate) initiator has a weight average molecular weight of 1,500 to 50,000.

2. The method according to claim 1, wherein the poly(3-hydroxypropionate) initiator is present in an amount of 0.01 parts by weight or more, based on 100 parts by weight of the lactide monomer.

3. The method according to claim 1, further comprising subjecting 3-hydroxypropionate to condensation polymerization to prepare the poly(3-hydroxypropionate) initiator.

4. The method according to claim 1, wherein the ring-opening polymerization is performed in the presence of one or more catalysts selected from the group consisting of an organometallic complex catalyst and an organic catalyst.

5. The method according to claim 4, wherein the organometallic complex catalyst is a catalyst of the following Chemical Formula 1:

$$MA^1_p A^2_{2-p} \qquad \text{Chemical Formula 1}$$

wherein in Chemical Formula 1:
    M is Al, Mg, Zn, Ca, Sn, Fe, Y, Sm, Lu, Ti or Zr;
    p is an integer from 0 to 2; and
    $A^1$ and $A^2$ are each independently an alkoxy or carboxyl group.

6. The method according to claim 5, wherein the $MA^1_p A^2_{2-p}$ is tin (II) 2-ethylhexanoate (Sn(Oct)$_2$).

7. The method according to claim 4, wherein the catalyst is present in an amount of 0.01 to 10 mol % based on 100 mol % of the lactide monomer.

8. The method according to claim 1, wherein the ring-opening polymerization is performed at 150 to 200° C. for 5 minutes to 10 hours.

9. The method according to claim 1, wherein the ring-opening polymerization is performed by bulk polymerization.

10. The method according to claim 1, wherein the polylactide-poly(3-hydroxypropionate)block copolymer has a weight average molecular weight of 10,000 to 400,000.

* * * * *